US010067853B2

(12) United States Patent
Kumar

(10) Patent No.: US 10,067,853 B2
(45) Date of Patent: Sep. 4, 2018

(54) GENERATING A DIRECTED GRAPH REPRESENTING APPLICATION PROGRAM EXECUTION FLOW FROM AN EXECUTION TRACE

(71) Applicant: CA, Inc., New York, NY (US)

(72) Inventor: Munish Kumar, Hicksville, NY (US)

(73) Assignee: CA, Inc., New York, NY (US)

(*) Notice: Subject to any disclaimer, the term of this patent is extended or adjusted under 35 U.S.C. 154(b) by 0 days.

(21) Appl. No.: 15/070,556

(22) Filed: Mar. 15, 2016

(65) Prior Publication Data

US 2017/0270026 A1    Sep. 21, 2017

(51) Int. Cl.
*G06F 9/44* (2018.01)
*G06F 11/36* (2006.01)

(52) U.S. Cl.
CPC ................... *G06F 11/3636* (2013.01)

(58) Field of Classification Search
CPC ..... G06F 11/3612; G06F 11/3636; G06F 8/75
See application file for complete search history.

(56) References Cited

U.S. PATENT DOCUMENTS

| | | | | |
|---|---|---|---|---|
| 5,889,999 A * | 3/1999 | Breternitz, Jr. | ......... | G06F 8/445 712/201 |
| 6,509,898 B2 * | 1/2003 | Chi | ................... | G06F 17/30014 345/440 |
| 2010/0125833 A1 * | 5/2010 | Matic | ........................ | G06F 8/75 717/125 |
| 2013/0205281 A1 * | 8/2013 | Pizlo | ........................ | G06F 8/443 717/128 |
| 2016/0124834 A1 * | 5/2016 | Davis | .................... | G06F 11/366 712/227 |

OTHER PUBLICATIONS

Wurthinger, "Visualization of Java Control Flow Graphs", Oct. 2006, pp. 1-49.*
Dr. Garbage, "Sourcecode Visualizer 2008", Aug. 20, 2008, pp. 1-3.*
Dr. Garbage, "Bytecode Visualizer", 2008-2014, pp. 1-3.*

(Continued)

*Primary Examiner* — Duy Khuong T Nguyen
(74) *Attorney, Agent, or Firm* — Meyertons, Hood, Kivlin, Kowert & Goetzel, P.C.

(57) ABSTRACT

An execution trace of an application program comprises a sequence of ordered programming instructions generated during execution of the application program indicating an execution flow of the application program. The sequence of ordered programming instructions is partitioned into a plurality of linked code segments comprising first and second code segments. The first code segment comprises a terminating programming instruction that terminates the first code segment and links the first code segment to an initial programming instruction of the second code segment. A directed graph representing the execution flow of the application program between the plurality of linked code segments is generated. The directed graph comprises a plurality of linked nodes representing the plurality of linked code segments. The directed graph is output to a graphical user interface (GUI) for display.

16 Claims, 9 Drawing Sheets

(56) References Cited

OTHER PUBLICATIONS

Foy, B. "Creating Perl Code Graphs", Dr. Dobb's online journal, Aug. 9, 2001, pp. 1-7, retrieved: Oct. 23, 2015; retrieved from internet: http://www.drdobbs.com/creating-perl-code-graphs/184404560.

Arnold, D. et al., "Stack Trace Analysis for Large Scale Debugging", Technical Report #1584, University of Wisconsin, Computer Sciences Department, Sep. 1, 2006, pp. 1-15, retrieved on Mar. 15, 2016, retrieved from internet: http://flp.cs.wisc.edu/paradyn/papers/Arnold06STAT.pdf.

Marsman, J., "Visual Studio 2010: How to understand your code using Dependency Graphs, Sequence Diagrams, and the Architecture Explorer", Blog article, May 11, 2010, pp. 1-10, Retrieved on Oct. 3, 2015, Retrieved from internet: https://blogs.msdn.microsoft.com/jennifer/2010/05/11/visual-studio-2010-how-to-understand-your-code-using-dependency-graphs-sequence-diagrams-and-the-architecture-explorer/.

Saunders, A. "Graph Layout for Code Flow Visualization", Dec. 13, 2007, pp. 1-15, Department of Computer Science, George Mason University.

* cited by examiner

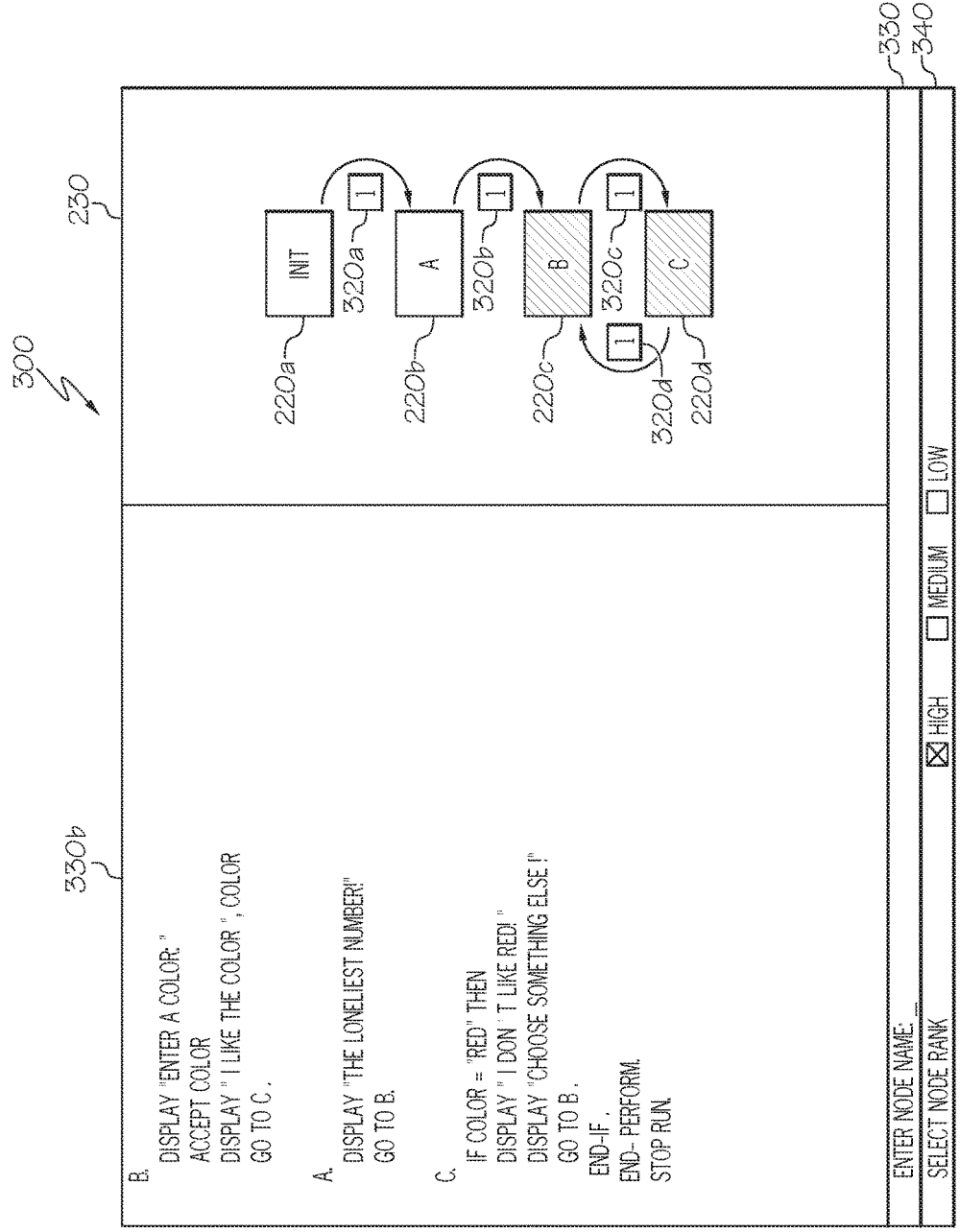

GENERATING A DIRECTED GRAPH REPRESENTING APPLICATION PROGRAM EXECUTION FLOW FROM AN EXECUTION TRACE

BACKGROUND

A processor executes an application program by executing programming instructions of the application program in sequence. The particular programming instructions and sequence executed frequently depend on certain run-time conditions. For example, a calendar program may comprise instructions to output the day of the week onto a display. Within these instructions is a code segment of instructions for outputting the word "Monday," a code segment of instructions for outputting the word "Tuesday," and so on for the other days of the week. The calendar program selects which code segment is appropriate to execute based on a determination of the current date. Thus, the code segment that outputs the word "Monday" is executed on a Monday, but is not executed on any other day of the week. Further, the calendar application may ordinarily execute the code segments according to the sequence Monday, followed by Tuesday. However, the user may be permitted to manually set the clock backwards, in which case, the sequence could be executed according to the sequence Tuesday, followed by Monday.

From this simple example, it is evident that the instructions executed by application program may depend on the conditions under which the application program is running. Such conditions are myriad, and often include input provided by a user, other executing programs, the contents of data being processed by the application program, and so on. In view of all the factors that may influence how application program executes, the execution flow of such an application program can be quite complex.

An execution trace of an application program can be helpful toward understanding which instructions were executed during the execution of an application program, and in what sequence. Such an execution trace is, at times, a valuable tool for finding errors in the application program, such as by identifying at what point the application program began executing an unintended code segment or triggering errors.

SUMMARY

Embodiments of the present disclosure process an execution trace of an application program in order to generate a directed graph that represents the execution flow of the application program and output that graph to a GUI for display. In particular, various embodiments of the present disclosure include computer-implemented methods, systems, apparatus, and non-transitory computer readable mediums storing computer program products for generating a directed graph representing an execution flow of an application program.

In an embodiment, a computer-implemented method comprises obtaining an execution trace of an application program. The execution trace comprises a sequence of ordered programming instructions generated during execution of the application program indicating an execution flow of the application program. The method further comprises partitioning the sequence of ordered programming instructions into a plurality of linked code segments comprising first and second code segments. The first code segment comprises a terminating programming instruction that terminates the first code segment and links the first code segment to an initial programming instruction of the second code segment. The method further comprises generating a directed graph representing the execution flow of the application program between the plurality of linked code segments. The directed graph comprises a plurality of linked nodes representing the plurality of linked code segments. The method further comprises outputting the directed graph to a GUI for display.

In another embodiment, a computing device comprises interface circuitry and processing circuitry. The interface circuitry is configured to control communications within the computing device. The processing circuitry is communicatively coupled to the interface circuitry and configured to obtain an execution trace of an application program. The execution trace comprises a sequence of ordered programming instructions generated during execution of the application program indicating an execution flow of the application program. The processing circuity is further configured to identify a plurality of linked code segments within the sequence of ordered programming instructions. The plurality of linked code segments comprise a first code segment comprising a terminating programming instruction that terminates the first code segment, and a second code segment comprising an initial programming instruction to which the terminating programming instruction of the first code segment is linked. The processing circuity is further configured to generate a directed graph representing the execution flow of the application program between the plurality of linked code segments. The directed graph comprises a plurality of linked nodes representing the plurality of linked code segments. The processing circuity is further configured to output the directed graph to a GUI for display.

In yet another embodiment, a non-transitory computer readable medium stores a computer program product for controlling a programmable computing device. The computer program product comprises software instructions that are executable to cause the programmable computing device to obtain an execution trace of an application program. The execution trace comprises a sequence of ordered programming instructions generated during execution of the application program indicating an execution flow of the application program. The software instructions are executable to further cause the programmable computing device to partition the sequence of ordered programming instructions into a plurality of linked code segments comprising first and second code segments. The first code segment comprises a terminating programming instruction that terminates the first code segment and links the first code segment to an initial programming instruction of the second code segment. The software instructions are executable to further cause the programmable computing device to generate a directed graph representing the execution flow of the application program between the plurality of linked code segments. The directed graph comprises a plurality of linked nodes representing the plurality of linked code segments. The software instructions are executable to further cause the programmable computing device to output the directed graph to a GUI for display.

The embodiments of the present disclosure are not limited to the above contexts or examples, but may include other features and advantages, such as those described in the following detailed description.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of an application program 125, generally, as opposed to discussion of particular instances of application programs 125a, 125b).

FIGS. 3A-3C are illustrations of example GUIs displaying a directed graph and corresponding source code according to one or more embodiments of the present disclosure.

DETAILED DESCRIPTION

Figure 1:
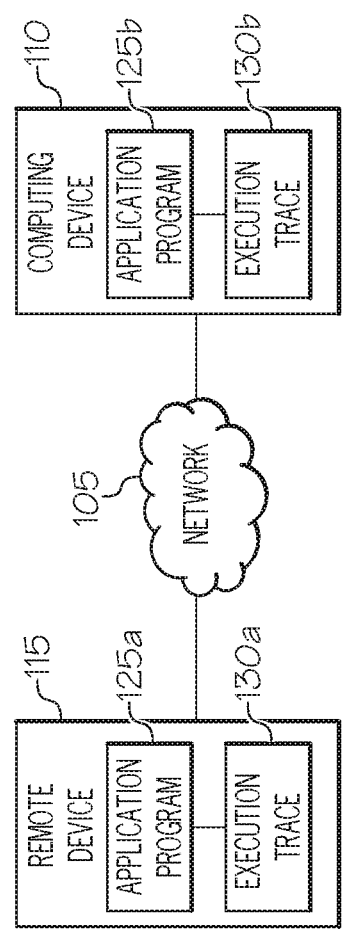
FIG. 1 is a block diagram illustrating an example network environment supporting devices according to one or more embodiments of the present disclosure.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Throughout this disclosure, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

In general, embodiments of the present disclosure relate to a computing device that generates a directed graph representing application program execution flow from an execution trace. FIG. 1 illustrates an example network environment 100 in which such a computing device 110 may operate. In the example of FIG. 1, the network environment 100 includes the computing device 110, a remote device 115, and a network 105 interconnecting the devices 110, 115.

The network 105 is any network capable of exchanging communication signals with the computing device 110 and remote device 115. Examples of the network 105 include (but are not limited to) one or more of: the Internet; one or more local area networks; one or more wireless networks; one or more cellular networks; one or more Internet Protocol-based networks; one or more Ethernet networks; one or more optical networks; and one or more circuit switched networks. The network 105 may comprise any number of networking devices such as routers, gateways, switches, hubs, firewalls, and the like (not shown) supporting the exchange of such communication signals.

The remote device 115 is communicatively connected to, and capable of exchanging signals with, the network 105. The remote device 115 is configured with appropriate processing circuitry to execute an application program 125a. During execution of the application program 125a, the remote device 115 generates an execution trace 130a, e.g., by recording individual instructions of the application program 125a in the order in which they are executed by the remote device's 115 processing circuitry. Examples of the remote device 115 include a personal computer, a laptop computer, a desktop computer, a workstation, a smartphone, a tablet computer, a wearable computer, a server, a server cluster, and a smart appliance.

The computing device 110 is also communicatively connected to, and capable of exchanging signals with, the network 105. As will be discussed in further detail below, the computing device 110 is configured with appropriate processing circuitry to execute an application program 125b. During execution of the application program 125b, the computing device 110 generates an execution trace 130b, e.g., by recording individual instructions of the application program 125b in the order in which they are executed by the computing device's 110 processing circuitry. Examples of the computing device 110 include a personal computer, a laptop computer, a desktop computer, a workstation, a smartphone, a tablet computer, a wearable computer, a server, a server cluster, and a smart appliance.

Although FIG. 1 depicts an example network environment 100 that comprises a network 105 and a remote device 115, other embodiments include standalone configurations of the computing device 110 (i.e., without the network 105 and remote device 115). Further, although FIG. 1 depicts application programs 125a, 125b as being separate, according to embodiments of the present disclosure application programs 125a, 125b are subcomponents of a distributed application program that divides application workload between the remote device 115 and computing device 110. In other words, various embodiments include an execution trace 130 of one or more application programs 125 executing on one more devices 110, 115 communicatively coupled to a network 105.

Further, FIG. 1 illustrates the computing device 110 obtaining execution trace 130b by generating the execution trace 130b during execution of application program 125b. However, the present disclosure is not so limited. For example, to obtain execution trace 130b according to other embodiments, the remote device 115 executes application program 125a and the computing device 110 receives the execution trace 130a from the remote device 115 over the network 105 and stores that trace locally as execution trace 130b. According to yet other embodiments, the computing device 110 obtains execution trace 130b by recording trace messages sent over the network 105 from remote device 115 to generate the execution trace 130b corresponding to the execution of application program 125a by the remote device 115. Further embodiments include the computing device 110 obtaining execution trace 130b from information generated during the execution of any number of application programs 125 executing on one or more devices (e.g., computing device 110, remote device 115) connected to the network 105.

Figure 2:
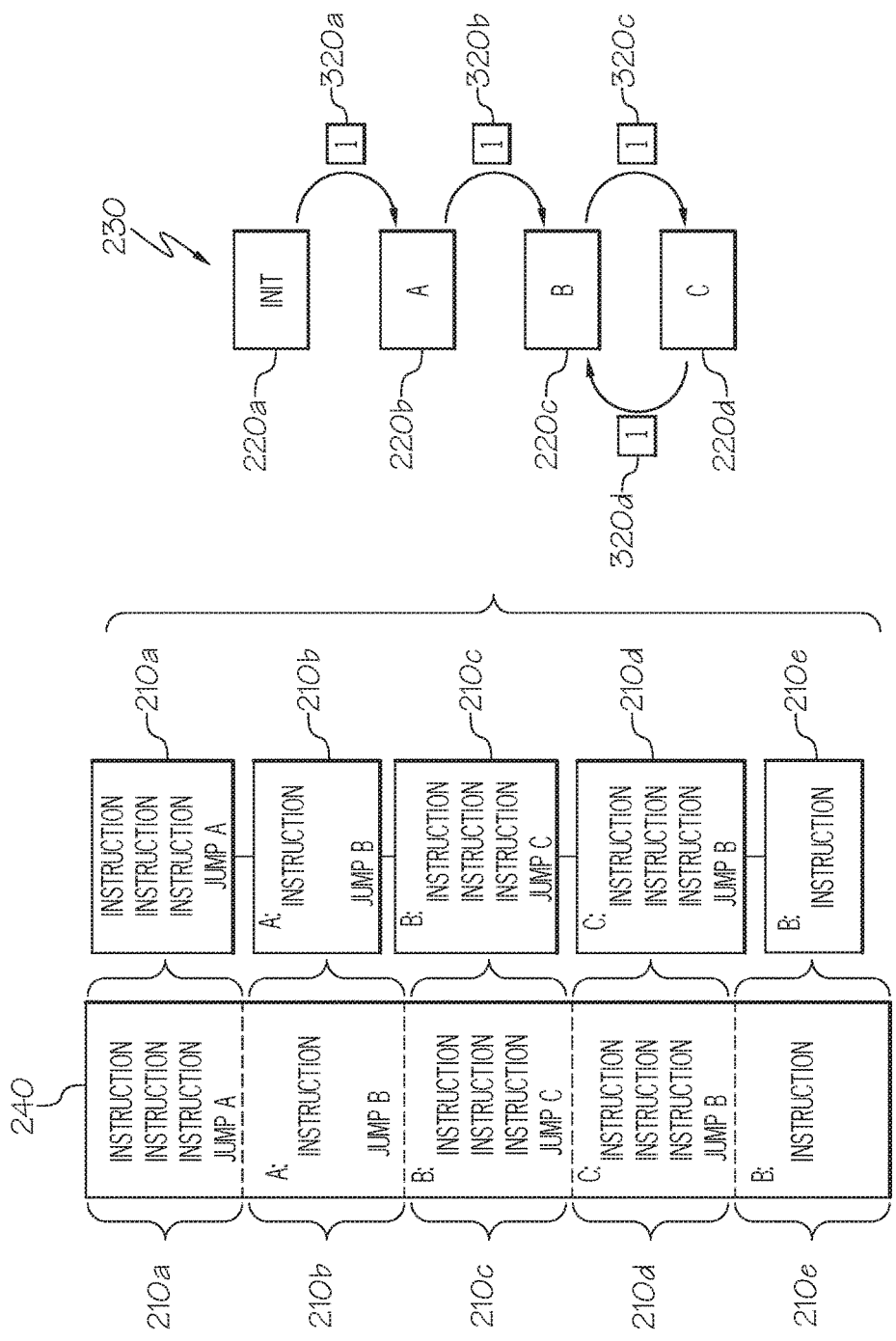
FIG. 2 is a block diagram illustrating the partitioning of a sequence of ordered programming instructions comprised in an execution trace of an application program according to one or more embodiments of the present disclosure.

The execution trace 130b obtained by the computing device 110 comprises a sequence of ordered programming instructions 240, such as illustrated in FIG. 2. FIG. 2 illustrates an example of producing a directed graph 230 based on such a sequence 240. As will be discussed in further detail below, the directed graph 230 is output to a display, e.g., to aid a user in understanding the execution flow of the application program 125. In this way, the execution flow captured by the execution trace 130 is graphically depicted for a user.

The sequence 240 indicates the execution flow of the application program 125 over some duration of execution. In some embodiments, this duration is from initial execution of the application program 125 until termination of the application program 125. In other embodiments, the sequence 240 indicates execution flow of a portion of the total execution of the application program 125. For example, sequence 240 may comprise instructions executed until the application program 125 hit a breakpoint configured by the user, such as through use of a debugger. Additionally or alternatively, sequence 240 may be generated in response to enabling execution tracing for an application program 125 that was already executing. Accordingly, such a sequence 240 may omit programming instructions that were executed before the execution trace was enabled for the application program 125.

The sequence 240 comprises a series of code segments 210a-e. With the exception of the first code segment 210a, the initial programming instruction of each code segment 210b-e is labeled. Although the initial programming instruction of the first code segment 210a may also be labeled, according to embodiments, such is not required in this example, as the initial programming instruction of the first code segment 210a is identifiable by virtue of being the very first programming instruction in the sequence 240.

In addition, with the exception of the last code segment 210e, the terminating programming instruction of each code segment 210a-d is a jump command. Although the terminating programming instruction of the last code segment 210e may also be a jump command, according to embodiments, such is not required in this example, as the terminating programming instruction of the last code segment 210e is identifiable by virtue of being the very last programming instruction in the sequence 240.

A jump command is an instruction that designates another instruction in the application program 125 as a target for execution immediately after the jump command. One type of jump command is an unconditional jump command, such as those illustrated in the example of FIG. 2. An unconditional jump command directs processing circuitry to execute the designated target instruction without requiring that any particular condition be met.

A jump command may designate another instruction as a target using a label. For example, a jump command may have the format "JUMP <target>." Such a label may originate from source code that corresponds to the sequence 240. For example, the label used to designate a jump target may be a text label, comment, function name, or sub-routine name, written into the source code of application program 125. Accordingly, the form of this label may depend on the particular language in which such source code is written.

Although not illustrated in FIG. 2, another type of jump command is a conditional jump command. Conditional jump commands direct processing circuitry to execute a target instruction (e.g., as designated by a corresponding label) when a certain condition is met. For example, a "JE <target>" instruction is a conditional jump command that directs x86-based processing circuitry to execute the target instruction in response to some previously compared values being equal. There are many kinds of conditional jumps that direct processing circuitry to execute the designated target under particular conditions. For example, some conditional jumps direct the processing circuitry to jump to the target instruction if a first value is greater than a second, jump if a first value is less than a second, or jump if an overflow has occurred. Indeed, many forms of jump command are known in the art, depending on the particular instruction set used by the instructions being executed. Other types of jump commands include, according to embodiments, function calls, subroutine calls, and/or thrown exceptions, to name a few.

The first code segment 210a comprises four instructions. Each of the first three instructions may be any instruction supported by the instruction set recorded into the sequence 240. Examples of such instructions include, for example, add, subtract, move, and/or compare instructions. Any or all of the first three instructions may also be a conditional jump (or other such jump command) that did not actually result in a jump occurring, e.g., due to the condition required for the jump not having been met. The fourth instruction (i.e., the terminating programming instruction of code segment 210a) is a jump command that actually resulted in a jump. This actual jump is evidenced by the fourth instruction designating "A" as its target, and the label "A" appearing immediately thereafter. This label identifies the initial programming instruction of code segment 210b.

Similarly, the terminating programming instruction of code segments 210b, 210c, and 210d are each a jump command that comprises a label indicating the initial programming instruction of code segments 210c, 210d, and 210e, respectively. Thus, each code segment 210a-210e transitions to the next code segment via a jump command.

The fifth (and final) code segment 210e comprises only a single instruction. Accordingly, this single instruction is both the initial programming instruction and the terminating programming instruction of that code segment 210e. This instruction is identified by the label "B." As shown in FIG. 2, the label "B" also identifies the initial programming instruction of the third code segment 210c. Thus, the instruction of the fifth code segment 210e is an additional instance of that instruction within the sequence 240. In other words, the instruction identified by the label "B" was executed more than once during the execution flow.

There are many reasons that may explain the existence of multiple instances of the label "B" and its corresponding instruction in the sequence 240. This may have occurred, for example, because the application program 125 comprises looping behavior of some kind. Indeed, the sequence 240 may comprise particular instructions (or blocks thereof) that are executed repeatedly, while other instructions (or blocks thereof) are only executed once (such as the first instruction in the sequence 240). Due any of a variety of influences on any particular execution flow, multiple executions of the same application program 125 may produce significantly different execution traces 130, each reflecting different transitions between instructions (or blocks thereof) in different combinations and with varying amounts of frequency. In this particular example, the instruction identified by the label "B" was executed twice.

The computing device 110 partitions the sequence 240 into a plurality of linked code segments 210a-e based on the actual jumps indicated by the sequence 240. This partitioning may be performed in different ways, according to various embodiments of the present disclosure. For example, the computing device 110 may create separate data structures (e.g., files, memory objects) respectively storing the programming instructions of each code segment 210a-e in a memory circuitry. As another example, the computing device 110 may identify code segments 210a-e within the sequence 240 and add annotations to a unified data structure storing the sequence 240 to indicate where the partitions between code segments 210a-e lie. As another example, the computing device 110 may identify code segments 210a-e within the sequence 240 and track where such partitions lie within the sequence 240 using, e.g., separately stored metadata and/or data objects.

Accordingly, the code segments 210a-e themselves are not necessarily modified by this partitioning process, according to various embodiments. Indeed, in the particular example of FIG. 2, the code segments 210a-e comprise the same instructions whether they are unidentified code segments 210a-e within the sequence 240, or whether they are identified as a plurality of linked code segments 210a-e and stored separately. Similarly, the code segments need not themselves be modified if partitioning is performed by tracking where partitions between code segments 210a-e lie using an external data structure or metadata. Notwithstanding, other examples may modify the code segments 210a-e, e.g., to include a pointer or identifier of the next code segment. Other useful information may similarly be included in the code segments 210a-e as part of the partitioning process, according to various embodiments.

In this particular example, the computing device 110 identifies each of the code segments 210a-e in response to detecting an instruction that is a jump command and detecting that the target label of the jump command follows immediately thereafter. Thus, in the example of FIG. 2, the end of the first code segment 210a and the start of the second code segment 210b are identified, and the sequence 240 is partitioned with code segments 210a, 210b linked. The computing device 110 similarly identifies and partitions the sequence 240 such that all of the code segments are linked as shown in FIG. 2.

In some embodiments, the computing device 110 increments a counter 320 each time the sequence 240 indicates that the execution flow transitions from one code segment 210 to another. In such an embodiment, counter 320a increments once based on the transition from code segment 210a to code segment 210b. Similarly, counter 320b increments once based on the transition from code segment 210b to code segment 210c. Counter 320c increments once based on the transition from code segment 210c to code segment 210d. Finally, counter 320d increments once based on the transition from code segment 210d to code segment 210c.

As mentioned before, the computing device generates a directed graph 230. The directed graph 230 comprises a plurality of linked nodes 220a-d that represents the plurality of linked code segments 210a-e. To represent the execution flow between code segments 210a, 210b, the computing device generates graph node 220a with a link to graph node 220b. The direction of the execution flow (i.e., from code segment 210a to code segment 210b) is represented in FIG. 2 by the unidirectional arrow from graph node 220a to graph node 220b, in this particular example.

Similarly, to represent the execution flow between code segments 210b, 210c, 210d, the computing device 110 generates a link from graph node 220b to graph node 220c, and a link from graph node 220c to graph node 220d. The direction of the execution flow (i.e., from code segment 210b to code segment 210c to code segment 210d) is represented in FIG. 2 by the unidirectional arrow from graph node 220b to graph node 220c, and the unidirectional arrow from graph node 220c to graph node 220d, in this particular example. Further, to represent the execution flow between code segments 210d, 210e (and to represent that execution flowed through the "B"-labeled instruction more than once), the computing device 110 generates a link from graph node 220d back to graph node 220c (i.e., the same graph node 220c that corresponds to code segment 210c).

Certain nodes 220 of the directed graph 230 may be identified according to the label associated with the initial programming instruction of the corresponding code segment 210. In this particular example, graph node 220b is identified as node A, since the code segment 210b corresponding to graph node 220b has an initial programming instruction with an "A" label. Similarly, graph node 220c is identified as node B, in view of the "B" label in code segment 210c, and graph node 220d is identified as node C, in view of the "C" label in code segment 220d.

Other nodes 220 may be identified in other ways. For example, as shown in FIG. 2, graph node 220a corresponds to a code segment 210a that does not have a labeled initial programming instruction. Accordingly, the computing device 110 generates and assigns an identifier for the node 220a, according to this example. In particular, the computing device 110 generates and assigns to graph node 220a the identifier "INIT," which identifies graph node 220a as the start of the execution flow depicted by the directed graph 230.

Figure 3A:
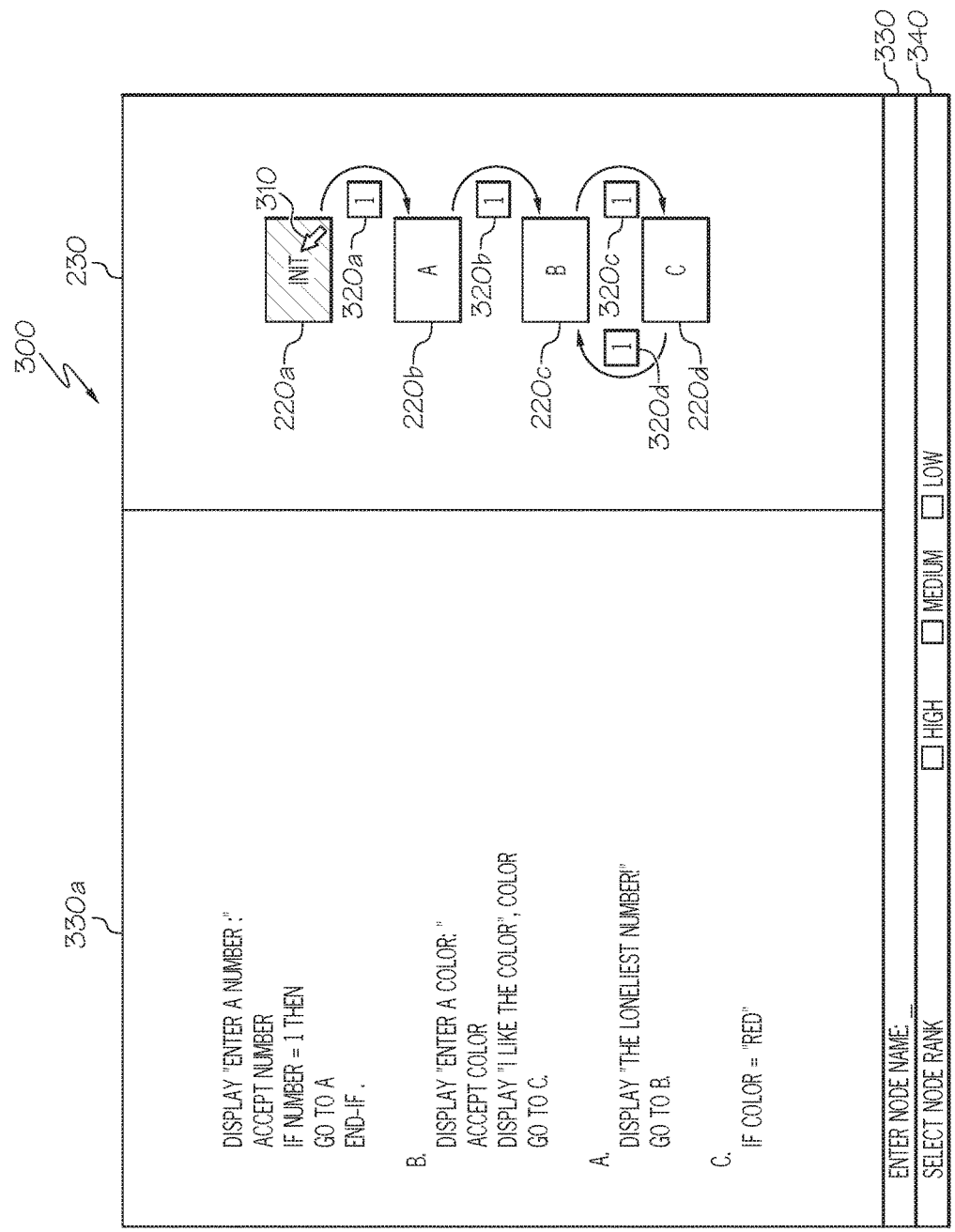

As previously discussed, the computing device 110 outputs the directed graph 230 to a GUI 300 for display. FIG. 3A illustrates an example of such a GUI 300. The GUI 300 comprises the directed graph 230, source code 330a of the application program 125, a text entry area 330 and a rank selection area 340. As previously discussed, the directed graph 230 comprises a plurality of linked nodes 220a-d. The links between nodes 220a-d are illustrated by unidirectional arrows which reflect the execution flow of the application program 125. Further, the computing device 110 outputs the counters 320a-d to the GUI 300 adjacent to its corresponding nodes 220 within the directed graph 230. Thus, counter 320a is displayed adjacent to nodes 320a, 320b. Counter 320b is displayed adjacent to nodes 320b, 320c. Counter 320c is displayed adjacent to nodes 320c, 320d. Counter 320d is also displayed adjacent to nodes 320c, 320d. To display a counter 320 adjacent to its corresponding nodes 220, the counter may be displayed on or near the link that represents execution flow between code segments 210. Although FIG. 3A uses unidirectional arrows to visually represent execution flow, where appropriate, embodiments of the present disclosure may use bidirectional arrows, e.g., to show that the execution flow transitioned from code segment 210c to code segment 210d and also flowed from code segment 210d back to code segment 210c.

The GUI 300 may be responsive to user input. For example, a user may select a node 220 in the directed graph 230 by using an input device (e.g., a mouse) of the computing device 110. In the example of FIG. 3A, a user uses a mouse to position a pointer 310 over, and select, graph node 220a. Responsive to the user selecting the node 220a, the computing device 110 notifies the GUI 300 to highlight node 220a. The computing device 110 also outputs, to the GUI 300, the source code 330a of the application program 125 that corresponds to the selected node 220a.

In the example of FIG. 3A, the selected node 220a corresponds to code segment 210a, which comprises the initial programming instructions of the application program 125 that were executed. Accordingly, the computing device 110 outputs source code 330a that corresponds to code segment 210a for display to the GUI 300. According to embodiments, the GUI 300 displays the source code 330 to the extent that such source code 330 fits within a particular display area. According to embodiments, the computing device 110 outputs source code 330 that corresponds to the code segment 210a and continues to output additional subsequence source code 330 until the display area is filled. Similar to the selection of node 220a, selection of nodes 220b, 220c, 220d causes the computing device 110 to notify the GUI 300 to display source code 330 corresponding to code segments 210b, 210c, and 210d, respectively.

Figure 3B:
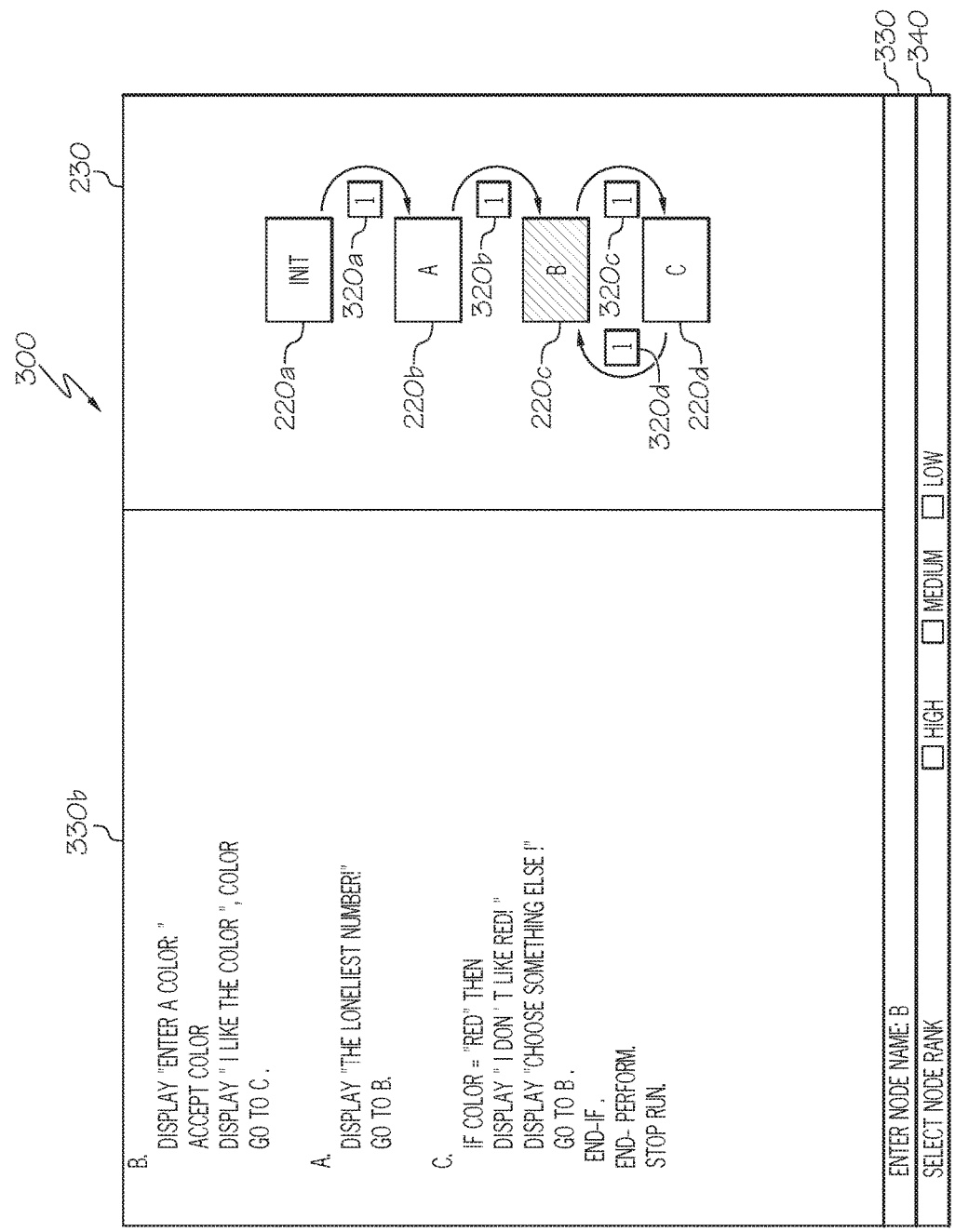

According to embodiments, a graph node 220 may be selected via text entry. In the example of FIG. 3B, a user enters text into text entry area 330 to select a graph node. In particular, responsive to receiving text that comprises the label of a code segment 210, the computing device 110 notifies the GUI 300 to highlight the graph node 220 that corresponds to that code segment 210. In this example, a user has entered "B" into the text entry area 330. In response, the computing device 110 selects, and notifies notified the GUI 300 to highlight, graph node 220c. The computing device 110 also outputs source code 330b corresponding to graph node 220c.

In other embodiments, a graph node 220 may be selected by receiving a rank indication. In such an example, the computing device 110 is configured to calculate a rank for each of the graph nodes 220a-d. The rank of each node is based on the ranks of the nodes linking to the node 220a-d. For example, because no nodes link to node 220a, the computing device 110 may calculate a low rank for node 220a. Because one low-ranked node links to node 220b, the computing device 110 may calculate a medium rank for node 220*b* (i.e., a rank higher than that of node 220*a*). Because node 220*c* is linked to by a medium rank node 220*b* and another node 220*d* of yet undetermined rank, the computing device 110 may calculate a high rank for node 220*c* (i.e., a rank higher than that of node 220*b*). Because node 220*d* is linked to by a high rank node 220*c*, the computing device 110 may calculate a high rank for node 220*d*. The user specifies one or more ranks using the rank selection area 340. The rank selection area 340 of FIG. 3C allows a user to specify a rank indication by checking one or more of the available ranks (i.e., high, medium, and/or low) by putting a checkmark in the appropriate checkbox. As shown in FIG. 3C, responsive to receiving a rank indication of "HIGH," the computing device 110 notifies the GUI 300 to highlight nodes 220*c* and 220*d*, each of which correspond to a high rank.

Although the above describes calculating rank according to a three-tier system of high, medium, and low, various embodiments may calculate rank differently. Example embodiments calculate a unique rank for each node 220. Other embodiments use numerical rankings. Yet further embodiments use a PageRank algorithm to calculate ranks. In particular embodiments, the computing device 110 iterates through the process of calculating ranks for the nodes 220 repeatedly, recalculating ranks until results stabilize. For example, after the rank for node 220*d* is calculated according to the example above, particular embodiments of the present disclosure recalculate the rank for node 220*c* based on the medium rank of node 220*b* and the high rank of node 220*d* (which was previously not yet calculated).

A user may wish to save the directed graph 230 for later review so that the GUI 300 may be cleared and used for some other purpose, or used to generate one or more further directed graphs 230. For example, a user may set multiple breakpoints in the execution of the application program 125, and the computing device 110 may generate directed graphs 230 corresponding to the execution flow of the application program 125 as of the time of each of the breakpoints, e.g., so that the user may observe how the execution flow changes over time or responsive to certain external stimulus or operating conditions.

Figure 4:
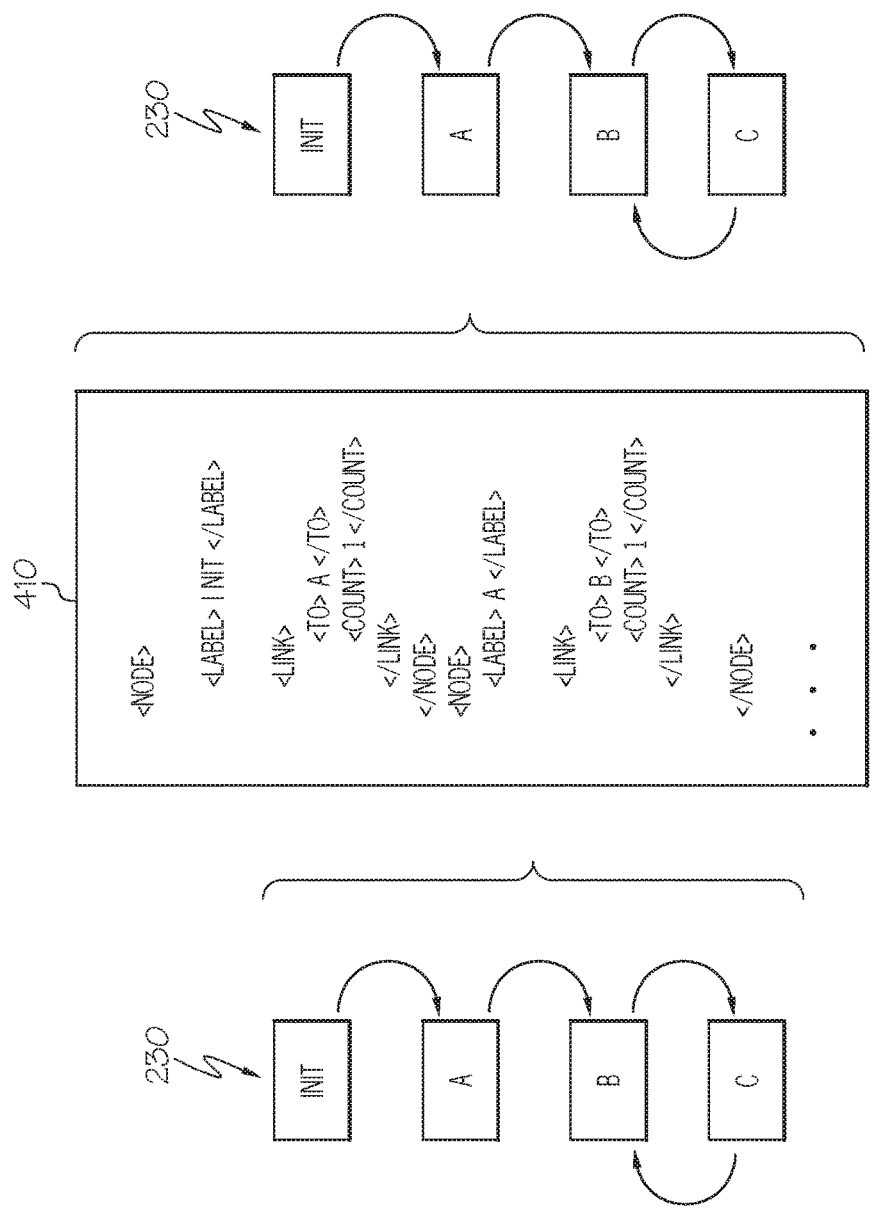
FIG. 4 is a block diagram illustrating converting a directed graph into a document and recreating the directed graph from the document according to one or more embodiments of the present disclosure.

Accordingly, as illustrated in FIG. 4, embodiments of the present invention convert a directed graph 230 into a document 410 formatted according to a document markup language (such as eXtensible Markup Language (XML) and/or HyperText Markup Language (HTML)) and store the document 410 in memory circuitry. After the computing device 110 notifies a display to clear the GUI 300, and responsive to a user selecting the document 410 (e.g., via a document selection dialog box), the computing device 110 recreates the directed graph 230 from the document 410 and outputs the recreated directed graph 230 to the GUI 300 for display.

Figure 5:
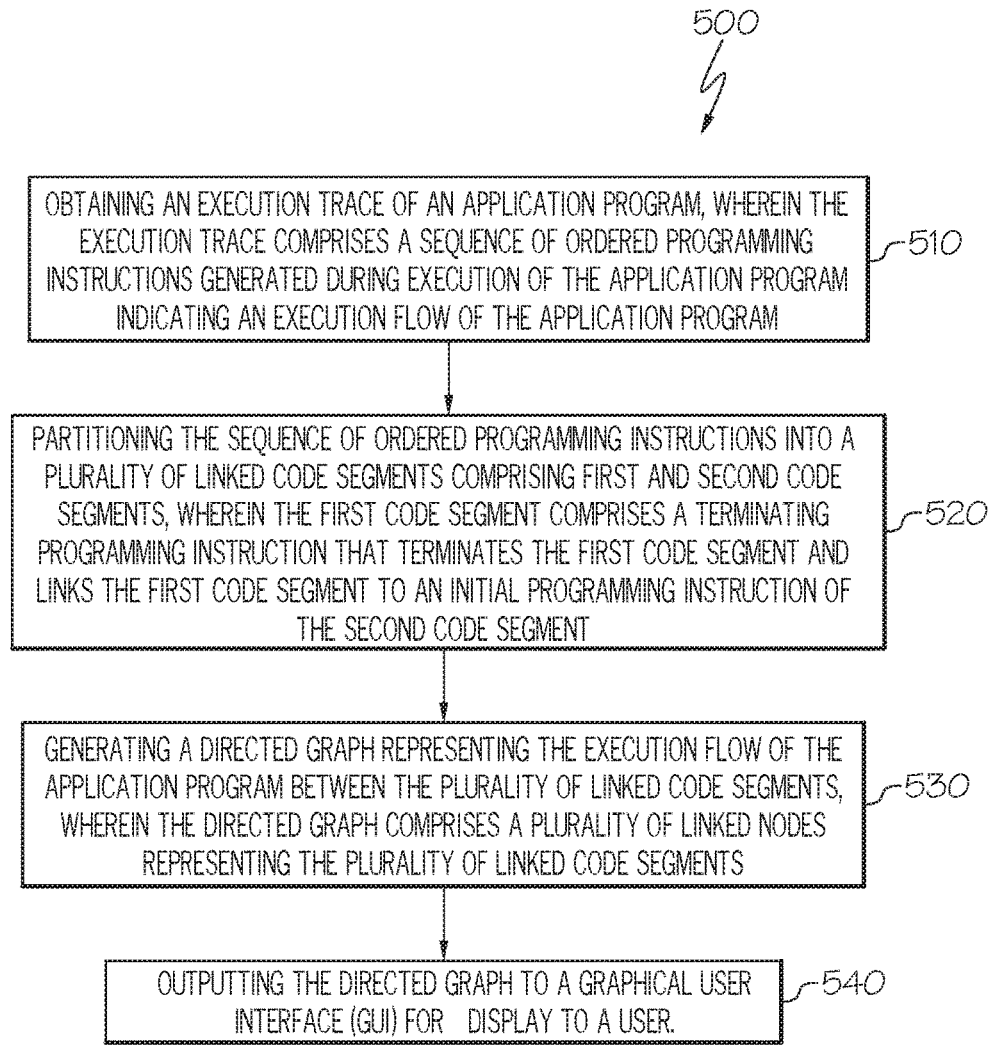
FIG. 5 is a flow diagram illustrating an example computer-implemented method according to one or more embodiments of the present disclosure.

In view of the above, an example of a computer-implemented method 500 according to embodiments of the present disclosure is illustrated in FIG. 5. The method 500 comprises obtaining an execution trace of an application program 125 (block 510). The execution trace comprises a sequence of ordered programming instructions 240 generated during execution of the application program 125 indicating an execution flow of the application program 125. The method 500 further comprises partitioning the sequence of ordered programming instructions 240 into a plurality of linked code segments 210*a-e* comprising first and second code segments 210*b*, 210*c* (block 520). The first code segment 210*b* comprises a terminating programming instruction that terminates the first code segment 210*b* and links the first code segment 210*b* to an initial programming instruction of the second code segment 210*c*. The method 500 further comprises generating a directed graph 230 representing the execution flow of the application program 125 between the plurality of linked code segments 210*a-e* (block 530). The directed graph 230 comprises a plurality of linked nodes 220*a-d* representing the plurality of linked code segments 210*a-e*. The method 500 further comprises outputting the directed graph 230 to a GUI 300 for display (block 540).

Figure 6:
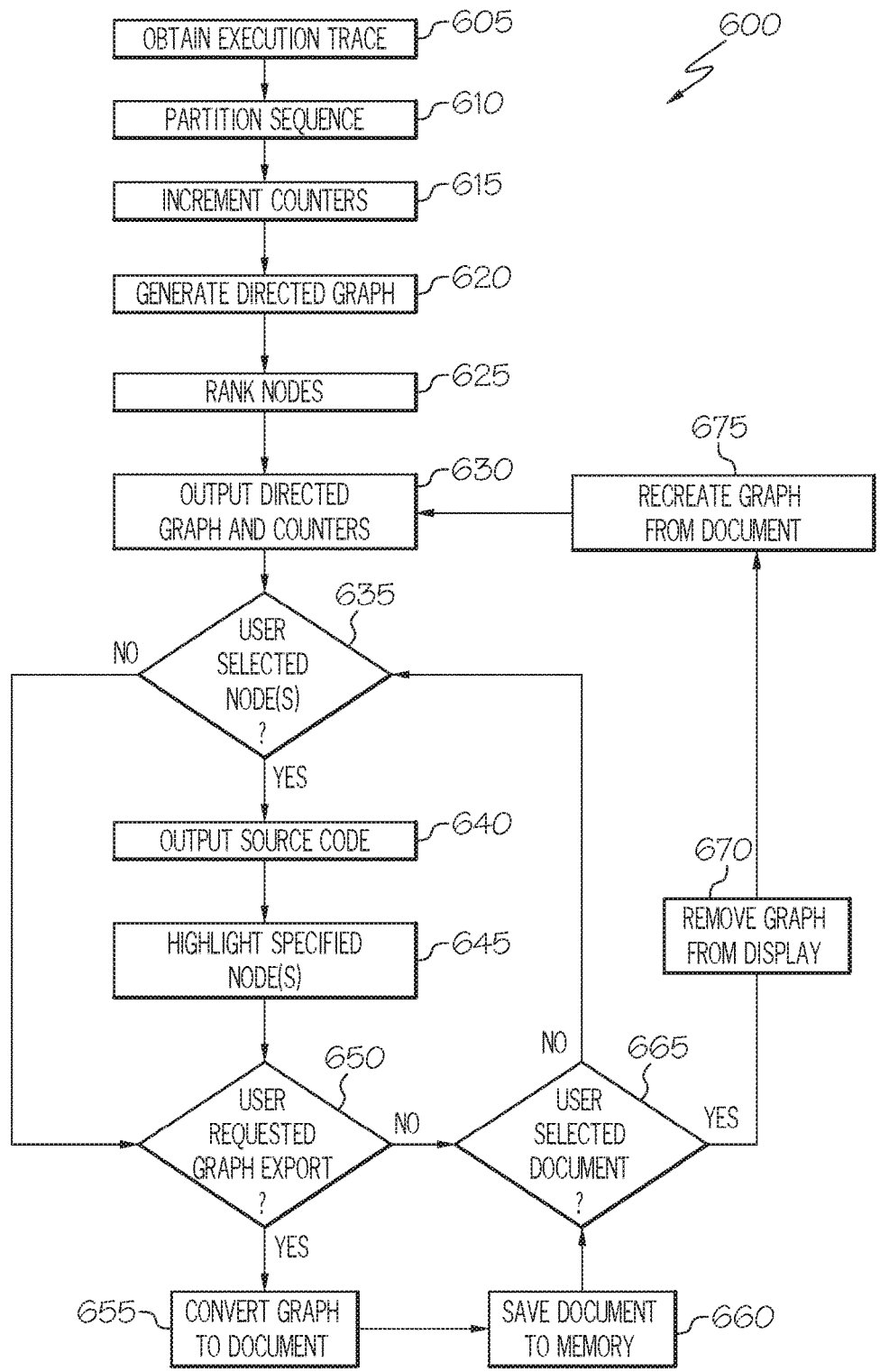
FIG. 6 is a flow diagram illustrating a detailed example computer-implemented method according to one or more embodiments of the present disclosure.

A more detailed example of a computer-implemented method 600 according to embodiments of the present disclosure is illustrated in FIG. 6. The method 600 comprises obtaining an execution trace of an application program 125 (block 605). The execution trace comprises a sequence of ordered programming instructions 240 as described above. The method 600 further comprises partitioning the sequence 240 into code segments 210 (block 610), and incrementing a respective counter 320 each time the sequence 240 indicates that the execution flow transitioned directly from one of the code segments 210 to another of the code segments 210 (block 615). The method 600 further comprises generating a directed graph 230 representing the execution flow of the application program 125 between the plurality of linked code segments 210 (block 620). According to the method 600, ranks are calculated for each of the nodes 220 in the directed graph 230 (block 625). The directed graph 230 and the counters 320 are output to a GUI 300 for display (block 630).

According to the method 600, in response to the user selecting a node 220 (block 635), source code 330 corresponding to the selected node 220 is output for display (block 640) and the GUI 300 is notified to highlight the selected node(s) 220 (block 645). In response to the user not selecting a node 220 (block 635), the method 600 proceeds without outputting source code 330 and highlighting nodes 220.

Regardless of whether the user selects a node, responsive to the user requesting that the directed graph 230 be exported (block 650), the directed graph 230 is converted to a document 410 formatted according to a document markup language (block 655). The document 410 is saved to memory (block 660). In response to the user not requesting that the directed graph 230 be exported (block 650), the directed graph 230 is not converted to a document 410 which is saved to memory.

Regardless of whether the user requests that the directed graph 230 be exported, responsive to the user selecting a document 410 (block 665), the directed graph 230 is removed from the display, e.g., by notifying the display to clear the GUI 300 (block 670). A directed graph 230 is then recreated from the selected document 410 (block 675) and output to the display along with corresponding counters (block 630). The user may then select one or more nodes 220 of the recreated directed graph 230 (block 635), as well as export the recreated directed graph 230 (block 650), e.g., to a different memory or alternate save location. Responsive to the user not selecting a document 410 (block 665), the method 600 does not remove the directed graph 230 from the display or recreate any directed graph 230 from any document, and instead awaits some input from the user (e.g., selection of a node (block 635), request of a graph export (block 650), and/or selection of a document (block 665)).

Figure 7:
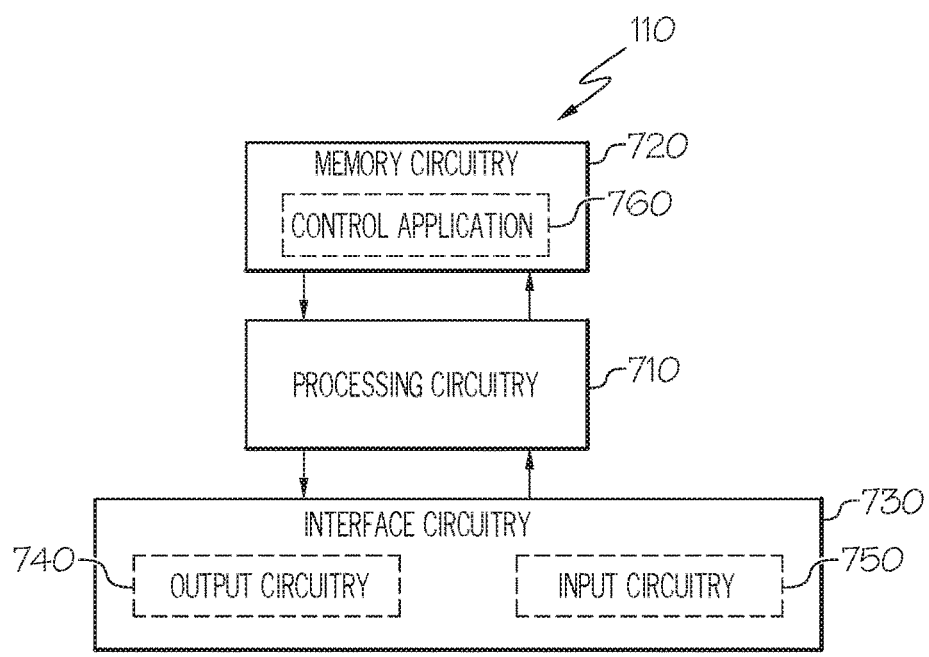
FIG. 7 is a block diagram illustrating example hardware configured according to one or more embodiments of the present disclosure.

Other embodiments of the present disclosure include computing device 110 implemented according to the example hardware illustrated in FIG. 7. The example hardware of FIG. 7 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals over a communications network 105 and data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network 105) and input circuitry 750 (e.g., receiver circuitry configured to receive communication signals over the communications network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the hardware illustrated in FIG. 7, the interface circuitry 730 is configured to control communications within the computing device 110. The processing circuitry 710 is configured to obtain an execution trace of an application program 125. The execution trace comprises a sequence of ordered programming instructions 240 generated during execution of the application program 125 and indicating an execution flow of the application program 125. The processing circuitry 710 is further configured to identify a plurality of linked code segments 210a-e within the sequence of ordered programming instructions 240. The plurality of linked code segments 210a-e comprises a first code segment 210b that comprises a terminating programming instruction that terminates the first code segment 210b. The plurality of linked code segments 210a-e further comprises a second code segment 210c that comprises an initial programming instruction to which the terminating programming instruction of the first code segment 210b is linked. The processing circuitry 710 is further configured to generate a directed graph 230 representing the execution flow of the application program 125 between the plurality of linked code segments 210a-e. The directed graph 230 comprises a plurality of linked nodes 220a-d representing the plurality of linked code segments 210a-e. The processing circuitry is further configured to output the directed graph 230 to a GUI 300 for display.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A computer-implemented method comprising:
  obtaining an execution trace of an application program, wherein the execution trace comprises a sequence of ordered programming instructions generated during execution of the application program indicating an execution flow of the application program;
  partitioning the sequence of ordered programming instructions into a plurality of linked code segments comprising first and second code segments, wherein the first code segment comprises a terminating programming instruction that terminates the first code segment and links the first code segment to an initial programming instruction of the second code segment;
  incrementing a counter each time the sequence of ordered programming instructions indicates that the execution flow transitioned directly from the first code segment to the second code segment;
  generating a directed graph representing the execution flow of the application program between the plurality of linked code segments, wherein the directed graph comprises a plurality of linked nodes representing the plurality of linked code segments;
  outputting the directed graph to a graphical user interface (GUI) for display;
  notifying the GUI to display the counter adjacent to first and second nodes corresponding to the first and second code segments, respectively;
  responsive to a user selecting a node of the plurality of linked nodes within the GUI, outputting, to the GUI, source code of the application program from which the ordered programming instructions in the linked code segment corresponding to the selected node was generated;
  converting the directed graph into a document formatted according to a document markup language;
  storing the document in memory circuitry;
  notifying a display to clear the GUI; and
  responsive to a user selecting the document, recreating the directed graph from the document and outputting the recreated directed graph to the GUI for display.

2. The computer-implemented method of claim 1, wherein the partitioning comprises responsive to detecting the terminating programming instruction and a label identifying the initial programming instruction, identifying the first and second code segments.

3. The computer-implemented method of claim 2:
wherein the plurality of linked nodes representing the plurality of linked code segments comprises one node that represents both:
the second code segment; and
a third code segment comprising an initial programming instruction that is an additional instance of the initial programming instruction of the second code segment;
wherein the partitioning further comprises responsive to detecting an additional instance of the label identifying the additional instance of the initial programming instruction, identifying the third code segment.

4. The computer-implemented method of claim 2, wherein the terminating programming instruction comprises a jump command that designates the label as a target of the jump command.

5. The computer-implemented method of claim 2, further comprising responsive to receiving text that comprises the label from a user, notifying the GUI to highlight a node that corresponds to the second code segment.

6. The computer-implemented method of claim 1, further comprising:
calculating a rank for each of the plurality of linked nodes, wherein the rank of each node is based on the ranks of the nodes linking to the node; and
responsive to receiving a rank indication corresponding to the rank of a linked node from a user, notifying the GUI to highlight the linked node within the GUI.

7. The computer-implemented method of claim 1, wherein the directed graph specifically represents the execution flow of the application program between the plurality of linked code segments upon reaching a first breakpoint in the execution of the application program, and the method further comprises generating a further directed graph representing the execution flow of the application program between the plurality of linked code segments upon reaching a subsequent second breakpoint in the execution of the application program, wherein the directed graph and the further directed graph collectively represent a change in the execution flow of the application program over time.

8. The computer-implemented method of claim 1 wherein generating a directed graph representing the execution flow of the application program between the plurality of linked code segments comprises:
generating a respective directed graph for each of a plurality of breakpoints set by the user in the execution of the application program, wherein each directed graph:
comprises a plurality of linked nodes representing the plurality of linked code segments; and
represents the execution flow of the application program between the plurality of linked code segments as of a time a corresponding breakpoint is reached; and
wherein the directed graphs, collectively, indicate a change in the execution flow over time.

9. A computing device comprising:
interface circuitry configured to control communications within the computing device; and
processing circuitry communicatively coupled to the interface circuitry and configured to:
obtain an execution trace of an application program, wherein the execution trace comprises a sequence of ordered programming instructions generated during execution of the application program and indicating an execution flow of the application program;
identify a plurality of linked code segments within the sequence of ordered programming instructions, the plurality of linked code segments comprising:
a first code segment comprising a terminating programming instruction that terminates the first code segment; and
a second code segment comprising an initial programming instruction to which the terminating programming instruction of the first code segment is linked;
increment a counter each time the sequence of ordered programming instructions indicates that the execution flow transitioned directly from the first code segment to the second code segment;
generate a directed graph representing the execution flow of the application program between the plurality of linked code segments, wherein the directed graph comprises a plurality of linked nodes representing the plurality of linked code segments;
output the directed graph to a graphical user interface (GUI) for display;
notify the GUI, via the interface circuitry, to output the counter adjacent to first and second nodes corresponding to the first and second code segments, respectively;
responsive to a user selecting a node of the plurality of linked nodes within the GUI, output, to the GUI via the interface circuitry, source code of the application program from which the ordered programming instructions in the linked code segment corresponding to the selected node was generated;
convert the directed graph into a document formatted according to a document markup language;
store the document in memory circuitry via the interface circuitry;
notify a display to clear the GUI via the interface circuitry; and
responsive to a user selecting the document, recreate the directed graph from the document and output the recreated directed graph to the GUI for display.

10. The computing device of claim 9, wherein to identify the plurality of linked code segments, the processing circuitry is configured to identify the first and second code segments responsive to detecting the terminating programming instruction and a label identifying the initial programming instruction.

11. The computing device of claim 10:
wherein the plurality of linked nodes representing the plurality of linked code segments comprises one node that represents both:
the second code segment; and
a third code segment comprising an initial programming instruction that is an additional instance of the initial programming instruction of the second code segment;
wherein to identify the plurality of linked code segments, the processing circuitry is further configured to identify the third code segment responsive to detecting an additional instance of the label identifying the additional instance of the initial programming instruction.

12. The computing device of claim 10, wherein the terminating programming instruction comprises a jump command that designates the label as a target of the jump command.

13. The computing device of claim 10, wherein the processing circuitry is further configured to receive text that comprises the label from a user via the interface circuitry, and in response, notify the GUI via the interface circuitry to highlight a node that corresponds to the second code segment.

14. The computing device of claim 9, wherein the processing circuitry is further configured to:
- calculate a rank for each of the plurality of linked nodes, wherein the rank of each node is based on the ranks of the nodes linking to the node; and
- responsive to receiving a rank indication corresponding to the rank of a linked node from a user via the interface circuitry, notify the GUI via the interface circuitry to highlight the linked node within the GUI.

15. A computer program product stored in a non-transitory computer readable medium for controlling a programmable computing device, the computer program product comprising software instructions that are executable to cause the programmable computing device to:
- obtain an execution trace of an application program, wherein the execution trace comprises a sequence of ordered programming instructions generated during execution of the application program indicating an execution flow of the application program;
- partition the sequence of ordered programming instructions into a plurality of linked code segments comprising first and second code segments, wherein the first code segment comprises a terminating programming instruction that terminates the first code segment and links the first code segment to an initial programming instruction of the second code segment;
- increment a counter each time the sequence of ordered programming instructions indicates that the execution flow transitioned directly from the first code segment to the second code segment;
- generate a directed graph representing the execution flow of the application program between the plurality of linked code segments, wherein the directed graph comprises a plurality of linked nodes representing the plurality of linked code segments;
- output the directed graph to a graphical user interface (GUI) for display;
- notify the GUI to display the counter adjacent to first and second nodes corresponding to the first and second code segments, respectively;
- responsive to a user selecting a node of the plurality of linked nodes within the GUI, output, to the GUI, source code of the application program from which the ordered programming instructions in the linked code segment corresponding to the selected node was generated;
- convert the directed graph into a document formatted according to a document markup language;
- store the document in memory circuitry via the interface circuitry;
- notify a display to clear the GUI via the interface circuitry; and
- responsive to a user selecting the document, recreate the directed graph from the document and output the recreated directed graph to the GUI for display.

16. The computer program product of claim 15:
- wherein the plurality of linked nodes representing the plurality of linked code segments comprises one node that represents both:
  - the second code segment; and
  - a third code segment comprising an initial programming instruction that is an additional instance of the initial programming instruction of the second code segment;
- wherein to partition the sequence of ordered programming instructions, the software instructions are further executable to cause the programmable computing device to:
  - identify the first and second code segments responsive to detecting the terminating programming instruction and a label identifying the initial programming instruction;
  - identify the third code segment responsive to detecting an additional instance of the label identifying the additional instance of the initial programming instruction.

* * * * *